United States Patent
Latshaw et al.

[11] Patent Number: 6,164,721
[45] Date of Patent: Dec. 26, 2000

[54] SEAT CUSHION FOR SHOPPING CARTS

[76] Inventors: Margaret M. Latshaw; David L. Latshaw, both of 1238 Eckert Ave., Reading, Pa. 19602

[21] Appl. No.: 09/440,982

[22] Filed: Nov. 16, 1999

[51] Int. Cl.[7] .................................................. A47D 1/10
[52] U.S. Cl. ................................ 297/256.17; 297/219.12
[58] Field of Search .......................... 297/219.1, 219.12, 297/229, 256.17, 250.1, 485

[56] References Cited

U.S. PATENT DOCUMENTS

| | | | |
|---|---|---|---|
| 1,964,193 | 6/1934 | Burnett | 297/423.1 X |
| 4,416,462 | 11/1983 | Thompson | 280/33.99 B |
| 4,712,833 | 12/1987 | Swanson | 297/219.12 X |
| 4,744,602 | 5/1988 | Campbell et al. | 297/423.4 X |
| 5,106,155 | 4/1992 | Luehring | 297/250 |
| 5,127,120 | 7/1992 | Mason | 297/219.12 X |
| 5,330,250 | 7/1994 | Reyes | 297/229 |
| 5,678,888 | 10/1997 | Sowell et al. | 297/256.17 |
| 5,845,967 | 12/1998 | Kane et al. | 297/219.12 X |
| 5,988,744 | 11/1999 | Franchak | 297/256.17 |

*Primary Examiner*—Peter R. Brown
*Attorney, Agent, or Firm*—Hendrson & Sturm LLP

[57] ABSTRACT

A padded seat construction 10 for use with a shopping cart 100 wherein the construction 10 includes a seat member 21 hingedly connected to a seat back member 20. In the first version of the invention, the seat member 21 has an outboard end dimensioned to be received in the divided leg opening 103 of the child receiving basket portion 101 of the shopping cart 100 and provided with generally tapered leg support portions 25 having cooperating fasteners 40, 41 that allow the leg support portions 25 to captively surround the horizontal cross bar 102 at the bottom of the divided leg opening 103 of the shopping cart. In the second version of the invention, the forward edge of the seat member is provided with a solid bulbous leg cushion element 28 divided by slots 26 into two leg support portions 25 provided for orthopedic support.

4 Claims, 2 Drawing Sheets

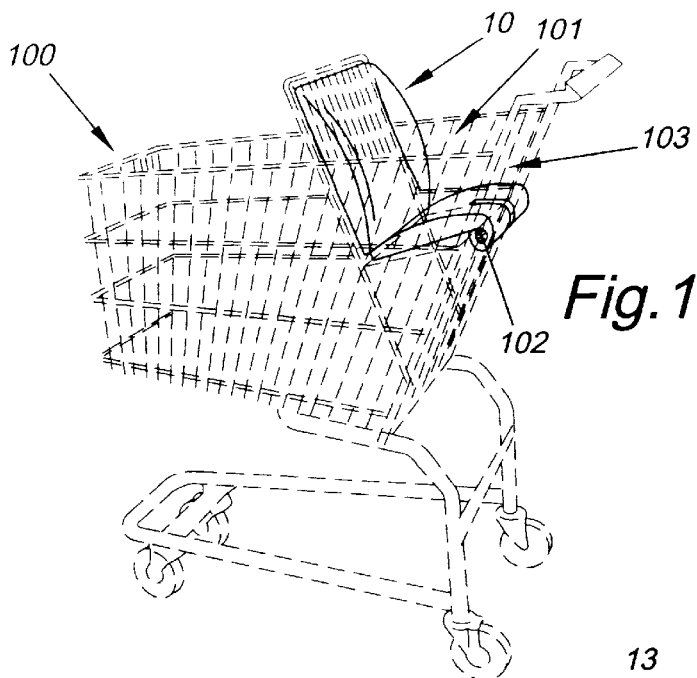
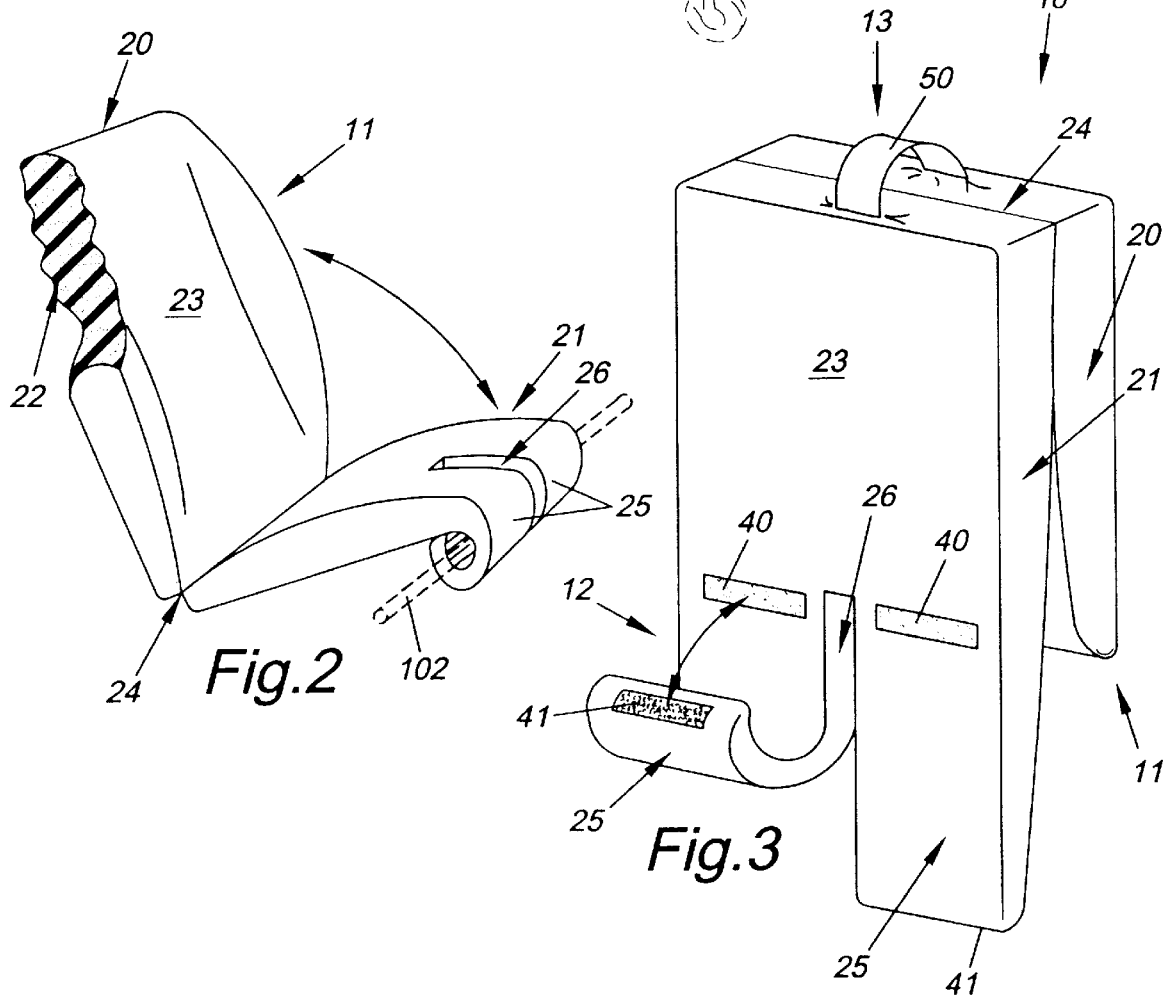

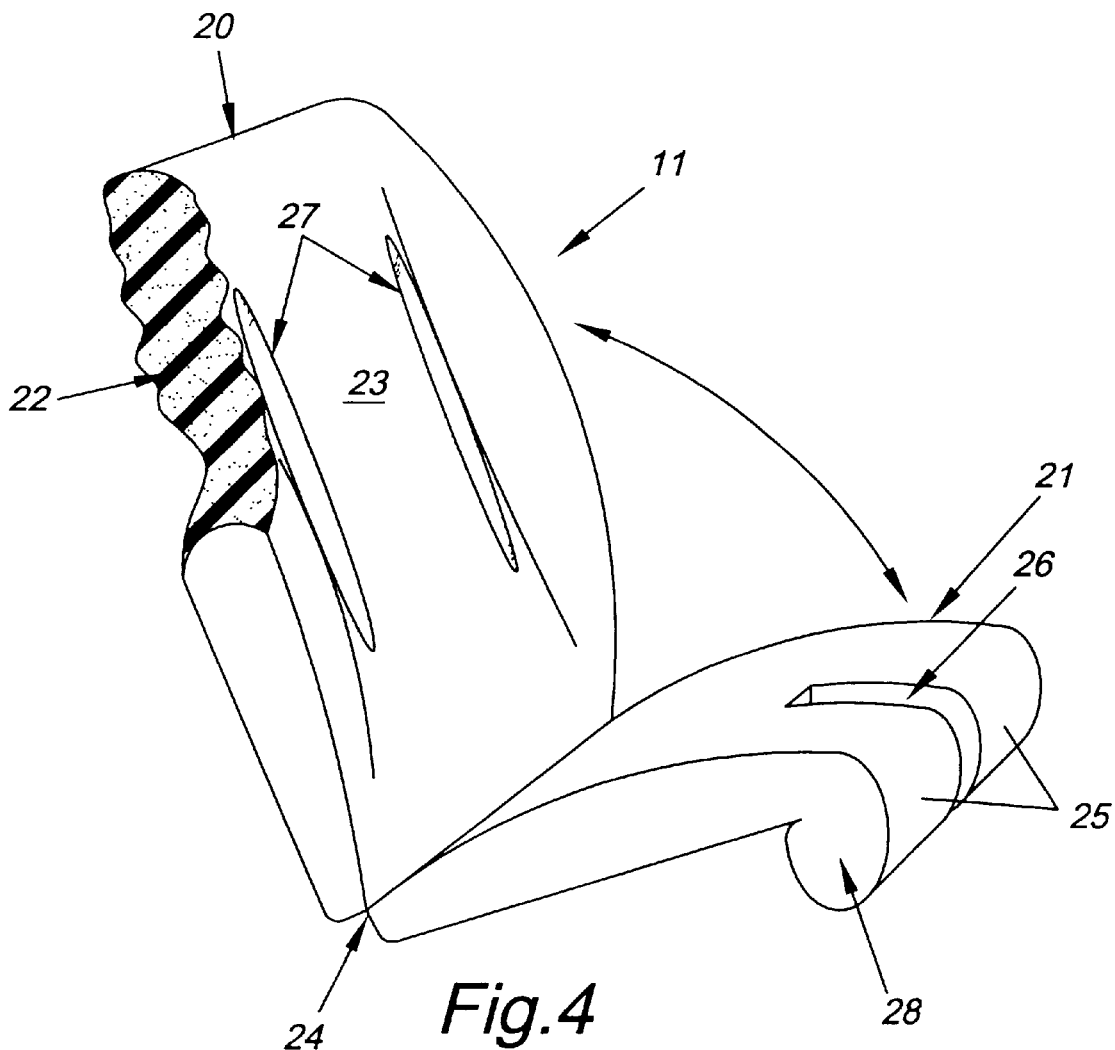

SEAT CUSHION FOR SHOPPING CARTS

BACKGROUND OF THE INVENTION

1. Field of the Invention

The present invention relates to the field of padded seats for shopping carts in general, and in particular to a padded seat having a unique method of attachment to the shopping cart.

2. Description of Related Art

As can be seen by reference to the following U.S. Pat. Nos. 4,416,462; 5,106,155; 5,330,250; and 5,678,888, the prior art is replete with myriad and diverse padded seats for shopping carts.

While all of the aforementioned prior art constructions are more than adequate for the basic purpose and function for which they have been specifically designed, they are uniformly deficient with respect to their failure to provide a simple, efficient, and practical way to temporarily affix the padded seat to the shopping cart in a safe and secure manner that will prevent the seat from sliding backwards towards the person pushing the cart due to the agitated movements of the child placed in the seat.

As most parents are aware, most padded seats for shopping carts are both difficult to install and lack a practical means of maintaining the padded seat in its desired orientation relative to the shopping cart.

As a consequence of the foregoing situation, there has existed a longstanding need for a new and improved type of padded seat for shopping carts wherein the relative stiffness of the seat and seat back panels as well as the method of attaching the seat to the cart prevents slippage, and the provision of such a construction is a stated objective of the present invention.

BRIEF SUMMARY OF THE INVENTION

Briefly stated, the padded seat construction for shopping carts that forms the basis of the present invention comprises in general a padded seat unit, a securing unit, and a transport unit.

As will be explained in greater detail further on in the specification in one version, the padded seat unit includes a seat back member hingedly secured to a seat member having a bifurcated leg cushion portion which is provided with the securing unit that will captively engage the seat construction to the shopping cart.

In a second version of the preferred embodiment, the forward edge of the seat member has a bifurcated bulbous leg cushion which is contoured to provide orthopedic support to the rear portion of the child's knee area while resting on top of the shopping cart seat.

In addition, both the seat back member and the seat member are fabricated from foam rubber or the like which is flexible, yet rigid such that when the securing unit is engaged with the shopping cart, the inherent stiffness of the seat back member and seat member will maintain the seat construction in its desired position within the shopping cart.

Furthermore, both the seat back member and the seat member are enclosed in a fabric envelope which forms the hinged connection between the seat back member and the seat member. The transport unit includes a strap member attached to the fabric envelope on opposite sides of the fabric hinge.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of a first version of the preferred embodiment of padded seat construction;

FIG. 2 is an isolated partial cut away perspective view of the first version of the padded seat construction;

FIG. 3 is a bottom perspective view of the seat construction showing the transport unit and the securing unit; and FIG. 4 is an isolated perspective view of a second version of the preferred embodiment of the seat construction.

DETAILED DESCRIPTION OF THE INVENTION

As can be seen by reference to the drawings, and in particular to FIG. 1, the first version of the padded seat construction for shopping carts that forms the basis of the present invention is designated generally by the reference number 10. As shown in FIG. 3, the seat construction 10 comprises in general a seat unit 11, a securing unit 12, and a transport unit 13. These units will now be described in seriatim fashion.

As can best be seen by reference to FIG. 2, the seat unit 11 comprises a padded seat back member 20 and a padded seat member 21 both fabricated from a relatively thick slab of resilient, yet rigid foam material 22 and hingedly connected together as at 24 by a protective cover member 23 which may be fabricated from cloth or a washable plastic material.

Turning now to FIGS. 2 and 3, it can be seen that the outboard end of the seat member 21 is bifurcated to form two spaced generally tapered leg support portions 25 which are separated by a slot 26 dimensioned to receive the conventional central support bar that is found on virtually all shopping carts 100 having an upper child receiving basket portion 101 as shown in FIG. 1.

Still referring to FIGS. 2 and 3, it can be seen that the securing unit comprises two pairs of complementary hook and loop fasteners 40, 41 wherein one pair of fasteners 41, 41 are disposed on the outboard ends of the leg support portions 25 and the other pair of fasteners 40, 40 are provided on the underside of the inboard ends of the leg support portions 25 such that each leg support portion 25 can captively engage the horizontal cross bar 102 which extends across the leg opening 103 found on shopping carts 100 as shown in FIG. 1.

Turning now to FIG. 3, it can be seen that the transport unit 13 comprises a strap member 50 whose opposite ends are secured to the cover member 23 on the opposite sides of the hinge 24 which operatively connects the seat member 21 to the seat back member 20.

In order to install the seat construction 10 in a conventional shopping cart 100, a parent would insert the outboard bifurcated portion of the seat member 21 such that both leg support portions 25 are disposed on the opposite sides of the vertical support bar that divides the leg opening 103 at the rear of the shopping cart 100.

At this juncture, both of the leg portions 25 would be bent underneath the horizontal cross bar 102 at the bottom of the leg opening 103 to engage the hook and loop fasteners 40, 41 to captively surround the horizontal cross bar 102 and prevent any forward or rearward horizontal displacement of the seat construction relative to the shopping cart 100.

In the second version of the preferred embodiment illustrated in FIG. 4, it can be seen that the only differences that exist between this version and the first version depicted in FIGS. 1 through 3, involves a pair of elongated slots 27 formed in the seat back member 20 and dimensioned to receive restraining straps (not shown) and the fact that the forward edge of the seat member 21 defines a solid bulbous leg cushion element 28 which is bifurcated as at 26 to form two leg support portions 25.

This bulbous leg cushion 28 is specifically designed to rest upon the floor of the basket portion 101 of the shopping cart 100 to elevate the child's knees and to provide orthopedic support to the rear portion thereof.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A padded seat cushion for use in a shopping cart having a child receiving basket portion provided with a divided leg opening wherein the construction comprises:

a seat unit including a padded seat member and a padded seat back member hingedly connected together wherein the seat member has a generally flat bottom surface and a forward edge provided with a solid bulbous leg cushion element which depends downwardly from said bottom surface, and is formed integrally with, said forward edge.

2. The construction as in claim 1 wherein the leg cushion element is divided by a slot into two leg support portions.

3. The construction as in claim 2 wherein the seat back member is provided with a pair of vertical slots.

4. The construction as in claim 1 wherein the seat back member is provided with a pair of vertical slots.

* * * * *